3,565,929
ORGANOTIN BENZOYLPHENOLATES OR HYDROXIDE, OXIDE, MERCAPTIDE CARBOXYLATE AND THIOCARBOXYLATE DERIVATIVES THEREOF

Toshio Seki, Osaka-shi, Kazaburo Suzuki, Kobe-shi, and Takashi Matsuzaki, Osaka-shi, Japan, assignors to Nitto Kasei Co., Ltd., Osaka, Japan, a corporation of Japan No Drawing. Original application July 26, 1966, Ser. No. 567,823, now Patent No. 3,498,947, dated Mar. 3, 1970. Divided and this application Mar. 26, 1969, Ser. No. 828,051

Int. Cl. C07f 7/22

U.S. Cl. 260—429.7                    6 Claims

---

ABSTRACT OF THE DISCLOSURE

Compounds are provided for light stabilization of resins, said compounds being of the formula

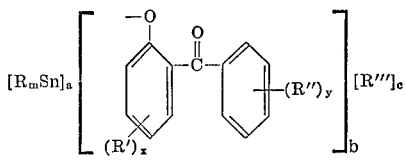

wherein R is alkyl of 1–18 carbon atoms, cycloalkyl, aryl, or benzyl, R' and R" are alkyl of 1–12 carbon atoms, alkoxy, hydrogen, hydroxyl, halogen, carboxyl, or benzoyl wherein said hydroxyl or carboxyl radical may be attached to the organotin radicals, R''' is hydroxyl or the residue of carboxylic acid of 1–18 carbon atoms, mercaptan, mercapto acid ester, or monoester maleate, provided that when $c$ is 1 or 2, R''' also represents an oxygen atom, $a$ is an integer from 1 to 3, $b$ is an integer from 1 to 3, $c$ is 0 or an integer from 1 to 2, $m$ is an integer from 1 to 3, and $x$ and $y$ are 0 or integers from 1 to 3.

---

This application is a division of copending application Ser. No. 567,823, filed July 26, 1966, now U.S. Pat. No. 3,498,947.

This invention relates to novel organotin compounds, and to synthetic resins stabilized therewith.

It is already known that organic compounds such as benzophenones, triazoles or salicylic acids are added as ultraviolet light absorbers to various synthetic resins which are susceptible to the effects of light, especially ultraviolet light in order to prevent resins from a deterioration.

Among these ultraviolet light absorbers now in common use, benzophenone compounds in particular have a high degree of fugacity caused by thermal decomposition, volatilization, and sublimation during the process of producing films, fibers, or other molded articles to be heated, and show a noticeable decrease in effect as ultraviolet light absorbers. They have a further defect that when they are applied to synthetic resins relatively unstable to the action of heat such as polyvinyl chlorides, they promote a heat deterioration of such resins. And when the synthetic resins are processed at a temperature above 200° C., the aforesaid defects become more severely enlarged.

In addition, when they are applied to fibers, diminution of the effect due to washing, coloration due to the reaction of extremely small quantities of metal ion or cleaning material with the ultraviolet light absorbers, etc. may be observed.

Now we have found a new group of organotin compounds without any defects aforementioned, in which the stabilizing properties inherent in the organotin radical are considerably enhanced by benzophenone compounds.

It is an object of this invention to provide novel organotin compounds. It is also an object of this invention to provide a method for preparing novel organotin compounds. Still another object of this invention is to provide stabilized synthetic resins containing novel organotin compounds. Other objects will be apparent on the inspection of the following description.

In accordance with certain of its aspects, this invention relates to a method of improving resistance especially to ultraviolet light of synthetic resins which comprises adding thereto one or more of organotin compounds of the formula:

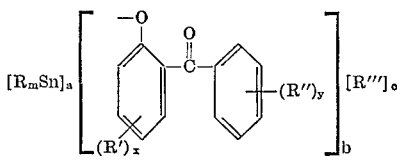

wherein R is alkyl of 1–18 carbon atoms, cycloalkyl, aryl, or benzyl, R' and R" are alkyl of 1–12 carbon atoms, alkoxy, hydrogen, hydroxyl, halogen, carboxyl, or benzoyl wherein said hydroxyl or carboxyl radical may be attached to the organotin radicals, R''' is hydroxyl or the residue of carboxylic acid of 1–18 carbon atoms, mercaptan, mercapto acid ester, or monoester maleate, provided that when $c$ is 1 or 2, R''' also represents an oxygen atom, $a$ is an integer from 1 to 3, $b$ is an integer from 1 to 3, $c$ is 0 or an integer from 1 to 2, $m$ is an integer from 1 to 3, and $x$ and $y$ are 0 or integers from 1 to 3.

In accordance with this invention, the organotin compounds having the aforesaid general formula may be prepared by heating a compound of the formula:

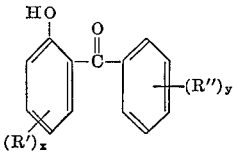

wherein R', R", $x$, and $y$ are as defined above and if desired mercaptan of 1–18 carbon atoms, mercapto acid ester, or carboxylic acid with tri-, di-, or mono-organotin oxide in an inert solvent medium such as benzene, toluene, etc. Instead of the organotin oxides there can be used also tri-, di-, or mono-organotin alkoxide.

The novel organotin compounds formed by practice of this invention are colorless to light yellow, crystalline or non-crystalline substances, which depends upon the kind of R to R''' radicals, and the value of $a$, $b$, $c$, $m$, $x$, and $y$ in the aforesaid general formula, and are soluble in the general organic solvents having a boiling point in the range of 40 to 300° C., e.g. aromatic hydrocarbon, alcohol, ether, ester, ketone, petroleum hydrocarbon, etc.

Examples of the organotin compounds which are suitable for use in the practice of this invention include, among others, the following:

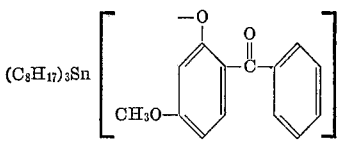

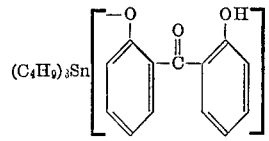

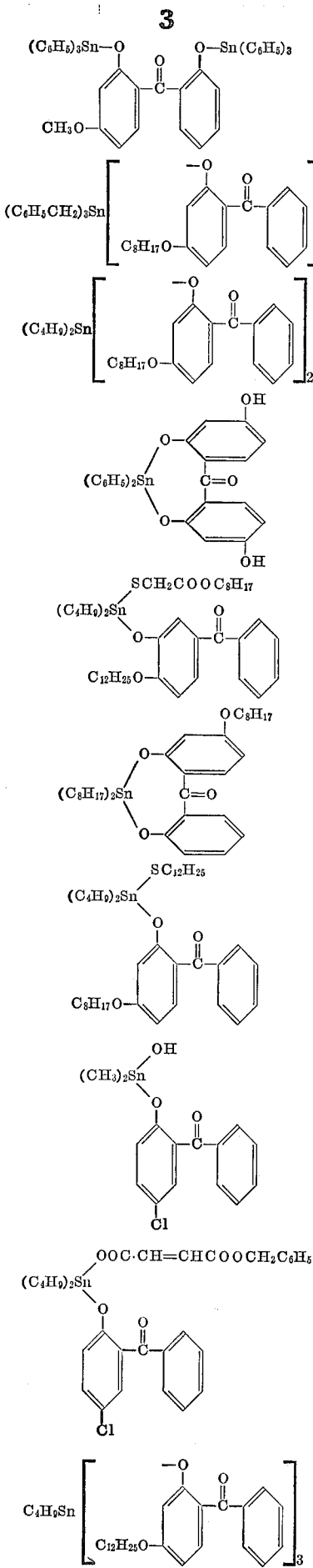

These ultraviolet light absorbers may be added to synthetic resins in several ways. For instance, the ultraviolet light absorber may be added to the synthetic resin reaction mixture before the preparation of the synthetic resins after which the admixture is polymerized and molded into films, fibers, or other articles, or it may be added to the synthetic resins together with other additives such as a stabilizer, an anti-oxidant, a colorant, a mold lubricant, etc. by mixers, e.g. a ribbon blender, a high-speed mixer, a stirring mixer, etc. after which the mixture is molded into films, fibers, or other articles. In addition, films, fibers, or other articles may be treated with solutions, suspensions or emulsions of the ultraviolet light absorbers by immersing or spreading. It is also possible to apply by adding the ultraviolet light absorbers to solutions, suspensions, or emulsions of the synthetic resins.

The synthetic resins which may be stabilized by the method of this invention include ABS resin, cellulose, acetal resin, fluoroplastics, acrylic resin, chlorinated polyether, alkyd resin, amino resin, urethane resin, epoxy resin, polyamide resin, phenoxy resin, furan resin, phenol resin, polyimide, polycarbonate, polyester, polyethylene, polypropylene, polystyrene, polyvinyl chloride, synthetic rubber, etc.

Preferably, the amount of the ultraviolet light absorbers to be employed in the process of this invention is in the range of 0.001 to 5% by weight based on the weight of the synthetic resins, which will vary depending upon the kind of molded articles and the manner in which the organotin compounds are added.

The process of this invention is of great advantage to the production of the synthetic resins when molded at a high temperature. This is noticeable industrial progress in contrast to that the conventional ultraviolet light absorbers have the defect that they stimulate thermal decomposition of resins at a temperature above 170° C. And when R''' is the residue of mercaptan, mercapto acid ester, carboxylic acid or monoester maleate in the aforesaid general formula, the ultraviolet light absorbers of the invention can also impart resistance to heat to the synthetic resins susceptible to the effects of thermal oxidation, e.g. ABS resins, chlorine-containing resins polyolefin, etc.

In the examples, to demonstrate the effectiveness of the novel organotin compounds with regard to deteriorative effects of ultraviolet light on the synthetic resins stabilized in accordance with this invention, a series of tests were carried out comparing the effects of various benzophenone compounds or non-additives according to the following procedure. A black board which was set at an angle of 45° on the south was lined with test specimens, and exposed outsides. For each specimen there were observed lowering of impact strength by Du Pont Type Impact Machine, discoloration, or degree of cracking. All parts are by weight unless otherwise indicated.

EXAMPLE 1

1/10 mole of 2,2'-dihydroxy-benzophenone (A) was reacted with 1/10 mole of trioctyltin methoxide in 200 cc. of toluene under reflux for 6 hours. The solvent was then distilled off under reduced pressure to give a compound (B) of the formula:

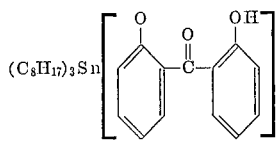

In order to provide a comparison as to the volatility by heat of the compounds (A) and (B), they were left in a Geer oven at 160° C. for 0.5 hour and the weight losses were examined. Only 1.2% of the compound (B) disappeared as weighed against 12% of the compound (A), and the infra-red spectra of the compound (B) were almost the same before and after the heat treatment.

0.5 gram of the compound (B) was added as an ultraviolet light absorber to 100 grams of styrene, the mixture was polymerized by heating at 100° C. for 2 days, and a sheet was made from the polymer thus obtained. The degree of turning yellow of the sheet was about 1/30 of that of the control sheet which was made by the same procedure as above but containing no ultraviolet light absorbers.

EXAMPLE 2

2/10 mole of 2-hydroxy-4-methoxy benzophenone (C) was reacted with 1/10 mole of bis-(tributyltin)-oxide in 200 cc. of benzene under reflux for 6 hours. The benzene was then distilled off under reduced pressure to give a compound (D) of the formula:

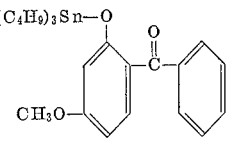

The compounds (C) and (D) were tested for volatility by the same procedure as in Example 1: (C), 8.7%; (D), only 1.06%.

The film of polyethylene glycol terephthalate having the thickness of 0.05 mm. was immersed in an acetone solution containing 2% by weight of the compound (D) at 10° C. for 30 seconds, and was dried at 180° C. for 30 seconds. The time required after which the film obtained became fragile was more than 3 times as long as that of the untreated film when they were exposed to ultraviolet light.

EXAMPLE 3

1/10 mole of 2,2'-dihydroxy-4-octoxy benzophenone (E) was reacted with 1/10 mole of diamyltin oxide in 200 cc. of toluene under reflux for 6 hours. The toluene was then distilled off under reduced pressure to give a compound (F) of the formula:

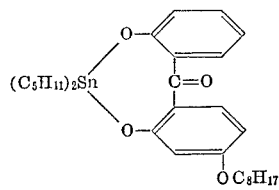

The compounds (E) and (F) were tested for volatility by the same procedure as in Example 1: (E), 4.2%; (F), only 0.9%.

100 milligrams of benzoyl peroxide and 0.5 gram of the compound (F) were mixed together in 400 cc. of methyl methacrylate and the solution was polymerized and molded into hard plates of 2 mm. thickness. Denoted by impact value, the brittleness on exposure to ultraviolet light of the thus obtained plate was 1/5 of that of a plate prepared by the same procedure as above but not containing ultraviolet light absorbers.

EXAMPLE 4

1/10 mole of 2-hydroxy-4-octoxy benzophenone (G) was reacted with 1/10 mole of dibutyltin oxide and 1/10 mole of dodecyl mercaptan in 200 cc. of benzene under reflux for 5 hours. The benzene was then distilled off under reduced pressure to give a compound (H) of the formula:

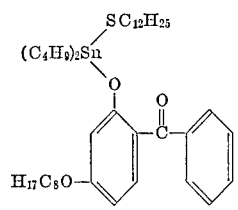

By the identical technique, a compound (I) of the formula:

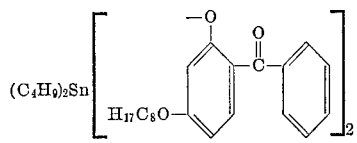

was prepared from 2/10 mole of 2-hydroxy-4-octoxy benzophenone (G) and 1/10 mole of dibutyltin oxide.

The compounds (G), (H), and (I) were tested for volatility by the same procedure as in Example 1: (G), 3.2%; (H), only 0.7%; (I), only 0.5%.

0.2 part of the compound (H) or (I) was added to 2,000 parts of 5% polyvinyl chloride solution in methylnaphthalene, and the solution was spread out on a glass plate. The methylnaphthalene was then stripped off from said glass plate under reduced pressure at 180° C. for 10 minutes to form a colorless, transparent thin film of polyvinyl chloride. This film was not discolored by the exposure to the sunlight for 12 months.

For comparison purposes, a film without both (H) and (I) compounds, and a film with 0.2 part of the compound (G) were made by the same procedure as above. The initial colors of the two films were yellow, and became brown after the exposure to the sunlight for 6 months in summer.

From these facts, it was found that the organotin compound (H) had extremely low volatility and that it rendered the polyvinyl chloride stable not only to light, but also to heat.

EXAMPLE 5

1/10 mole of 2-hydroxy-4-methoxy benzophenone (C) referred to in Example 2 was reacted with 1/10 mole of dibutyltin dimethoxide and 1/10 mole of monobenzyl maleate in 200 cc. of toluene under reflux. The solvent was then distilled off under reduced pressure to give a compound (J) of the formula:

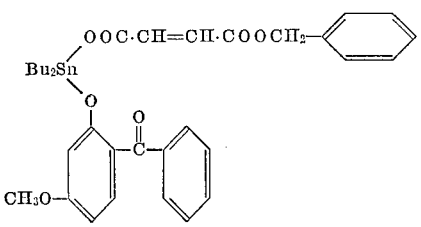

The compounds (C) and (J) were tested for volatility by the same procedure as in Example 1: (C), 8.7%; (J), 2.0%.

3 parts of dibutyltin-bis-(benzyl maleate) as a stabilizer, 1 part of dibutyltin dilaurate as a lubricant, 0.6 part of the compound (J), and 0.4 part of the compound (H) used in Example 4 were mixed together thoroughly with 100 parts of vinyl chloride resins. The mixture was sheeted on a mixing mill heated at a surface temperature of 180° C. The sheet obtained was colorless and transparent, and gave no coloration after exposure to the sunlight over a long period of 32 consecutive months.

For comparison purposes, there were made a sheet comprising the same composition as above but not containing the compounds (J) and (H) and a sheet containing 1 part of the compounds (C) instead of the compounds (J) and (H) in the same manner as above. The former was colorless and transparent, and was not discolored after exposure to the sunlight for 22 consecutive months, but the latter was light yellow in color, and turned brown after exposure to the sunlight for 12 months. From these results, it was found that the compound (C) might act no further as an ultraviolet light absorber in view of the fact that the compound (C) had accelerated the thermal decomposition of the synthetic resins in process of preparing the vinyl chloride resins.

EXAMPLE 6

2/10 mole of 2-hydroxy-4-methoxy benzophenone (C) was reacted with 1/10 mole of monobutyl stannoic acid and 3/10 mole of dodecyl mercaptan in 200 cc. of toluene under reflux for 6 hours. The toluene was then distilled off under reduced pressure to give a compound (K) of the formula:

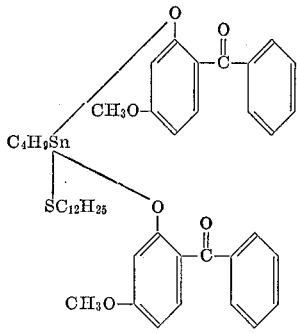

The compounds (C) and (K) were tested for volatility by the same procedure as in Example 1: (C), 8.7%; (K), only 1.6%.

0.5% of the compound (C) or (K) was added to ABS resins (acrylonitrile-butadiene-styrene terpolymer), and the mixture was injection molded into flat plates. The plate containing the compound (C) was yellow in color but the plate containing the compound (K) was white in color, which shows that the compound (C) accelerated the thermal decomposition of the ABS resin. The time required to reduce the impact strength of the plate with the compound (K) to half by means of the irradiation of ultraviolet light was 9 to 11 times as long as that of the plate with the compound (C) as measured by Du Pont Type Impact Machine.

EXAMPLE 7

2/10 mole of 2-hydroxy-4-octoxy-benzophenone (G) was reacted with 1/10 mole of bis-tribenzyltin oxide in 600 cc. of heptane under reflux for 8 hours. The heptane was then distilled off under reduced pressure to give a compound (M) of the formula:

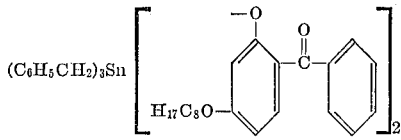

The compounds (G) and (M) were tested for volatility by the same procedure as in Example 1: (G), 3.2%; (M), 0.4%.

Polypropylene containing 0.1% of 2,6-di-tertiary butyl-4-methyl phenol and 0.2% of dilauryl thio-dipropionate, and the mixture of said polypropylene with 0.3% of the compound (M) were melt extruded. The fibers obtained were pure white in color in each case, whereas the fibers made from polypropylene with 0.3% of the compound (G) instead of the compound (M) was light yellow in color. These fibers were washed with anion or non-ionic cleanser and dried in the sun repeatedly. Only the fibers with the compound (G) became yellow in color in several washings and dryings. The time required for percentage maximum elongation of the fibers with the compound (M) to be reduced to half by the irradiation of ultraviolet light was 22 times as long as in case of the fibers without any ultraviolet light absorbers, and was 8 times as long as in case of the fibers with the compound (G).

EXAMPLE 8

1/10 mole of 2,2'-dihydroxy-4,4'-dimethoxy benzophenone (N) was reacted with 1/10 mole of monooctyltin oxide in 600 cc. of hexane under reflux for 4 hours. The hexane was then distilled off under reduced pressure to give a compound (O) of the formula:

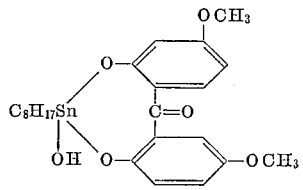

The compounds (N) and (O) were tested for volatility by the same procedure as in Example 1: (N), 4.6%; (O), 0.9%.

1.5% of the compound (O) was added to polyethylene, and the mixture was extruded into a film of 0.6 mm. thickness. For comparison purposes, an additional film was prepared from polyethylene without any additives by the same technique. Both of the films were colorless. These films were exposed to ultraviolet light until their impact strength reduced to half in order to test them for resistance to ultraviolet light. As a result, the polyethylene film containing the compound (O) was to be exposed 17 times as long as one containing the compound (N).

Although this invention has been illustrated by reference to specific examples, numerous changes and modification thereof which clearly fall within the scope of the invention will be apparent to those skilled-in-the-art.

We claim:
1. A compound for use as an ultraviolet absorber for synthetic resins having the formula

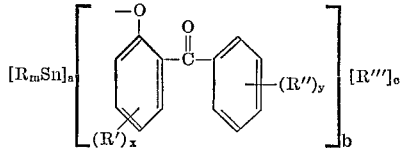

wherein R is alkyl of 1–18 carbon atoms, cycloalkyl, aryl, or benzyl, R' and R" are alkyl of 1–12 carbon atoms, alkoxy, hydrogen, hydroxyl, halogen, carboxyl, or benzoyl wherein said hydroxyl or carboxyl radical may be attached to the organotin radicals, R''' is hydroxyl or the residue of carboxylic acid of 1–18 carbon atoms, mercaptan, mercapto acid ester, or monoester maleate, provided that when $c$ is 1 or 2, R''' also represents an oxygen atom, $a$ is an integer from 1 to 3, $b$ is an integer from 1 to 3, $c$ is 0 or an integer from 1 to 2, $m$ is an integer from 1 to 3, and $x$ and $y$ are 0 or integers from 1 to 3.

2. The novel ultraviolet absorber of claim 1 is

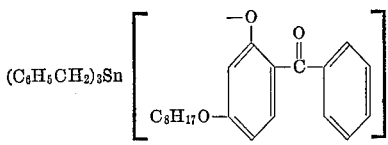

3. The novel ultraviolet absorber of claim 1 is

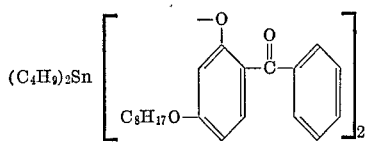

4. The novel ultraviolet absorber of claim 1 is

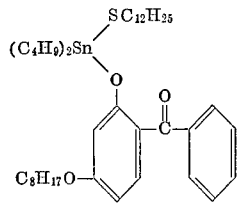

5. The novel ultraviolet absorber of claim 1 is

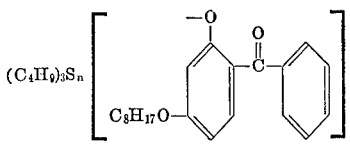

6. The novel ultraviolet absorber of claim 1 is

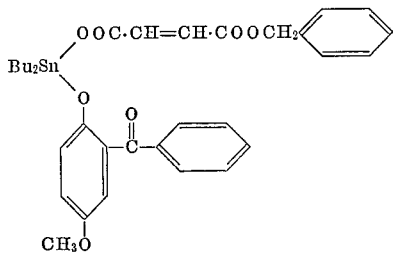

References Cited
UNITED STATES PATENTS

| | | | |
|---|---|---|---|
| 2,832,750 | 4/1958 | Weinberg et al. | 260—429.7X |
| 3,208,968 | 9/1965 | Cyba et al. | 260—45.75 |
| 3,216,969 | 11/1965 | Cyba et al. | 260—45.75 |
| 3,268,567 | 8/1966 | Cyba et al. | 260—429.7 |
| 3,290,247 | 12/1966 | Wilson et al. | 260—429.7X |
| 3,415,875 | 12/1968 | Leuthi et al. | 260—429.7X |

TOBIAS E. LEVOW, Primary Examiner
W. F. W. BELLAMY, Assistant Examiner

U.S. Cl. X.R.
260—45.75